(12) United States Patent
Sugaya et al.

(10) Patent No.: US 7,277,412 B2
(45) Date of Patent: Oct. 2, 2007

(54) COMMUNICATIONS SYSTEM, COMMUNICATIONS CONTROL APPARATUS AND METHOD, AND COMPUTER PROGRAM THEREFOR

(75) Inventors: Shigeru Sugaya, Kanagawa (JP); Kazuhisa Takamura, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 10/406,383

(22) Filed: Apr. 4, 2003

(65) Prior Publication Data

US 2004/0008641 A1    Jan. 15, 2004

(30) Foreign Application Priority Data

Apr. 15, 2002    (JP) .............................. 2002-112412

(51) Int. Cl.
  *H04B 7/212* (2006.01)
  *H04J 3/00* (2006.01)
(52) U.S. Cl. .................. 370/337; 370/336; 370/329; 370/332; 370/347; 370/280; 455/450; 455/447; 455/67.11
(58) Field of Classification Search ................ 370/337, 370/336, 280, 329, 332, 347, 321, 348
  See application file for complete search history.

(56) References Cited

U.S. PATENT DOCUMENTS 6,069,885 A * 5/2000 Fong et al. ................. 370/336
6,085,094 A * 7/2000 Vasudevan et al. ......... 455/447
6,134,231 A * 10/2000 Wright ........................ 370/348
6,181,918 B1 * 1/2001 Benveniste ................. 455/63.2
6,952,456 B1 * 10/2005 Aiello et al. ................. 375/295
6,970,448 B1 * 11/2005 Sparrell et al. ............. 370/347
7,023,833 B1 * 4/2006 Aiello et al. ................. 370/348
7,031,371 B1 * 4/2006 Lakkis ........................ 375/146

FOREIGN PATENT DOCUMENTS

JP    2000-278280    10/2000
JP    2002-111685    4/2002

OTHER PUBLICATIONS

Bob Huang, et al., "Standards Text for Child and Neighbor Piconet Functionality", IEEE P802.15 Working Group for Wireless Personal Area Networks (WPANs), Nov. 2001, pp. 1-14.

* cited by examiner

*Primary Examiner*—Marceau Milord
(74) *Attorney, Agent, or Firm*—Oblon, Spivak, McClelland, Maier & Neustadt, P.C.

(57) ABSTRACT

A communications system sets a network frame period that can be repeatedly used by a plurality of wireless networks in a predetermined time period. A plurality of channel slots for use by each of the wireless networks is prepared in advance in the network frame. A coordinator operating a PAN activates its PAN in an area of a channel slot that is not used by the other coordinator(s). Since each of the wireless networks detects an unused channel slot in the network frame and uses the unused channel slot, the association process is greatly simplified.

9 Claims, 13 Drawing Sheets

FIG. 7

| BEACON IDENTIFIER | APPARATUS IDENTIFIER | NETWORK SYNCHRONIZATION PARAMETER | GTS ALLOCATION INFORMATION | OPERATING CHANNEL SLOT INFORMATION | OTHER SLOT INFORMATION |

COMMUNICATIONS SYSTEM, COMMUNICATIONS CONTROL APPARATUS AND METHOD, AND COMPUTER PROGRAM THEREFOR

BACKGROUND OF THE INVENTION

1. Field of the Invention

The present invention relates to communications systems, communications control apparatuses and methods, and computer programs therefor for enabling a plurality of wireless stations to intercommunicate with one another, and more particularly relates to a communications system, a communications control apparatus and method, and a computer program therefor for configuring a network under the control of a specific control station.

More particularly, the present invention relates to a communications system for enabling a plurality of wireless networks to coexist with one another and to a communications control apparatus and method and a computer program therefor for controlling a communications operation in each wireless network under a communications environment in which a plurality of wireless networks are in contention with one another. More specifically, the present invention relates to a communications system for enabling a plurality of wireless networks that are in contention with one another in the same frequency band to coexist with one another and to a communications control apparatus and method and a computer program therefor for controlling a communications operation in each communications network under a communications environment in which a plurality of wireless networks are in contention with one another in the same frequency band ("the same frequency band" includes the Ultra-Wideband (UWB) wireless communications for performing data transmission and reception by spreading the data over a very wide frequency band).

2. Description of the Related Art

A plurality of computers is connected with one another to configure a local area network (LAN) to share information such as files and data, to share peripheral devices such as printers, and to exchange information by transferring email and data content.

Known LANs are configured by establishing wired connections using optical fibers, coaxial cables, or twisted-pair cables. In this case, a circuit laying construction is necessary, which makes it difficult to configure the network. Also, the cable laying is complicated. After the LAN has been configured, the movable range of each apparatus is restricted by the cable length, which is inconvenient. A system that liberates the user from the wiring in such a known wired LAN is a wireless LAN, which has drawn public attention. According to this type of wireless LAN, most of the wiring or cables can be omitted in work space such as an office. A communications terminal such as a personal computer (PC) can thus be moved relatively easily.

Due to an increase in the speed and a decrease in the cost of the recent wireless LAN systems, the demand therefor has been tremendously growing. In particular, recently introduction of a personal area network (PAN) has been studied in order to perform information communications by configuring a small wireless network among a plurality of personal electronic apparatuses. For example, different wireless communications systems are defined using the frequency band, such as the 2.4 GHz band or the 2.5 GHz band, which does not require a license from the competent authorities.

For example, the IEEE (Institute of Electrical and Electronics Engineers) 802.15.3 Working Group has been conducting standardization activities of high-rate wireless personal area networks (WPANs) exceeding 20 Mbps. The corresponding section recommends the standardization in compliance with a physical (PHY) layer that mainly uses signals in the 2.4 GHz band.

In this type of wireless personal network, one wireless communications apparatus operates as a control station referred to as a "coordinator", and a PAN is configured around the coordinator within a range of approximately 10 m. The coordinator cyclically transmits a beacon signal in a predetermined period. A period bounded by transmission of consecutive beacon signals is defined as a transmission frame period. In each transmission frame period, time slots to be used by wireless communications apparatuses are allocated.

As the time slot allocation method, for example, "guaranteed time slot" (GTS) and "dynamic time division multiple access (TDMA)" methods are adopted. Such communications methods dynamically allocate transmission bands while ensuring a predetermined transmission capacity.

For example, a contention access period (CAP) and a contention free period (CFP) are provided for a MAC (Media Access Control) layer to be standardized by IEEE 802.15.3. In the case of asynchronous communications, CFP is used to exchange short data or command information. In contrast, stream communications is performed by a mechanism involving dynamically allocating a GTS to perform channel-allocated transmission.

The MAC layer to be standardized by IEEE 802.15.3 is defined to accommodate standard specifications for PHY layers other than the PHY layer that uses signals in the 2.4 GHz band. Also, standardization activities for using, as the PHY layer to be standardized by IEEE 802.15.3, a PHY layer other than that using signals in the 2.4 GHz band have been gradually started.

Recently, wireless LAN systems using spread spectrum (SS) have been put into practice. In addition, UWB transmission using SS, which is targeting applications such as PAN, has been proposed.

In direct-sequence spread spectrum (DS-SS), which is one type of SS, an information signal at the transmitter side is multiplied by a random code sequence, which is referred to as a pseudo noise (PN) code, thereby spreading the information signal over a wider bandwidth, and the information signal is transmitted. At the receiver side, the received spectrum-spread information signal is multiplied by the PN code to de-spread and read the information signal. In UWB transmission, the spreading ratio applied to the information signal is increased to a maximum. High-rate data transmission is realized by performing transmission and reception by spreading data over, for example, a very wide frequency band of 2 GHz to 6 GHz.

UWB uses a signal sequence of extremely short duration (approximately 100 pico seconds) impulses to configure an information signal, and the signal sequence is transmitted/received. The occupied bandwidth is the band in the order of GHz, where the occupied bandwidth divided by its center frequency (for example, 1 GHz to 10 GHz) is approximately one. The occupied bandwidth is much wider than the bandwidth that is generally used by a wireless LAN using the so-called W-CDMA, cdma 2000, SS, or orthogonal frequency division multiplexing (OFDM).

FIG. 13 illustrates an example of data transmission using UWB. Input information 901 is spread by a spread code 902. Multiplication of the input information 901 by the spread code 902 may be omitted depending on the type of system using UWB.

Spectrum-spread information signal 903 is modulated using a UWB impulse signal (wavelet pulses) to generate a signal 905. The possible modulation schemes include pulse position modulation (PPM), biphase modulation, amplitude modulation (AM), and the like.

Since the UWB impulse signal consists of extremely narrow pulses, in terms of frequency spectrum, a very wide band is used. The power of the input information signal thus becomes less than or equal to the noise level in each frequency area.

Although the received signal 905 is lost in noise, the received signal 905 is detectable by computing a correlation value between the received signal 905 and the impulse signal. Since signals are spread in many systems, many impulse signals are transmitted with respect to one bit of transmitted information. A reception correlation value 907 of the impulse signal can be further integrated with respect to the length of the spread code 902 to generate an integrated signal 908. Accordingly, the transmitted signal is detected more easily.

The spread signal generated by the UWB transmission scheme only has a power less than or equal to the noise level in each frequency area. For this reason, a UWB-transmission-based communications system can coexist with other types of communications systems in a relatively easy manner.

A communications environment will now be considered that includes many apparatuses in the office due to the widespread use of information apparatuses such as PCs, the apparatuses being linked with one another by wireless networks. Two or more wireless networks may reside in the small work environment. In such a case, the plural wireless networks coexist with one another in the same frequency band. The "same frequency band" includes the UWB wireless communications for performing data transmission and reception by spreading the data over a very wide frequency band.

The specification for the PHY layer using signals in the 2.4 GHz band, which is to be standardized by the above-described IEEE 802.15.3, must take into consideration the coexistence with other wireless communications systems that operate in the same frequency band.

One known method, for enabling wireless networks to coexist with one another is a "Child Piconet" method described in the IEEE P802.15.3 Draft 0.9. The "Child Piconet" method allows a communications apparatus included in a network serving as a parent to generate a child network under the control of a control station for the parent network and to operate the child network. Specifically, a portion of a frame period used by the parent network is allocated as a frame period used by the child network.

Another method for enabling wireless networks to coexist with one another is a method for configuring a "Neighbor Piconet", which is described in the IEEE P802.15.3 Draft 0.9. According to this method, control stations for two independent wireless networks each allocate a band to use in the other wireless network within a frame period.

Since the "Child Piconet" method for enabling a plurality of wireless networks to coexist with one another uses the parent-child network relationship on a time-sharing multiplexing basis, the child network must once be included in the parent network. This involves a network joining operation (hereinafter referred to as "association"), which makes the operation complicated.

If the child network cannot communicate with the control station for the parent network, the wireless networks cannot build the parent-child relationship.

According to the latter wireless-network coexisting method, the processing for allocating a band to use in the other wireless network in the frame period is necessary.

In other words, one wireless network must join the other wireless network, undergo a predetermined procedure, and then allocate the band to use in the other wireless network. Control thus becomes complicated.

In contrast, in the case of the UWB wireless communications network, data transmission/reception is performed by spreading the data over a very wide band. This makes impossible to employ a method for providing a plurality of channels in the frequency domain. In other words, a technique for multiplexing a network by using different frequency channels for corresponding wireless networks, as in the known wireless LAN, cannot be applied. It thus becomes difficult for a plurality of UWB wireless communications systems to coexist with one another in the same space.

Since the impulse signal sequence used by the UWB wireless communications scheme has no specific frequency carrier, carrier sense is difficult to perform. Therefore, for example, when the UWB wireless communications scheme is applied to the PHY layer of IEEE 802.15.3, access control using carrier sense standardized by the corresponding section cannot be performed since there is no specific carrier signal. The only possible choice is to use access control on a time-sharing multiplexing basis involving a plurality of channels in the time domain.

SUMMARY OF THE INVENTION

In view of the foregoing technical problems, it is an object of the present invention to provide an excellent communications system for enabling a plurality of wireless networks that are in contention with one another to coexist with one another and to provide an excellent communications control apparatus and method and a computer program therefor for appropriately controlling a communications operation in each wireless network under a communications environment in which a plurality of wireless networks are in contention with one another.

Another object of the present invention is to provide an excellent communications system for enabling a plurality of wireless networks that are in contention with one another in the same frequency band to coexist with one another and to provide an excellent communications control apparatus and method and a computer program therefor for appropriately controlling a communications operation in each wireless network under a communications environment in which a plurality of wireless networks are in contention with one another in the same frequency band.

A further object of the present invention is to provide an excellent wireless communications system, a wireless communications apparatus and method, and a computer program therefor for realizing the coexistence of a plurality of wireless networks that are in contention with one another without a complicated procedure involving association of one wireless network with another wireless network.

In order to achieve the foregoing objects, according to a first aspect of the present invention, a communications system for allowing coexistence of a plurality of networks operated by time division multiple access (TDMA) in the same space is provided. The communications system sets a network that is repeatedly usable by a plurality of wireless networks and prepares in advance a plurality of channel slots for use by each of the wireless networks in the network frame. Accordingly, each of the wireless networks residing in the same space shares an unused channel slot.

The word "system" refers to a logical set of apparatuses (or functional modules for realizing specific functions). The apparatuses or functional modules need not be contained in a single casing.

According to the communications system as set forth in the first aspect of the present invention, a network frame that can be repeatedly used by a plurality of wireless networks is set in a predetermined time period. In the network frame, a plurality of channel slots for use by each of the wireless networks is prepared in advance.

Each coordinator operating a PAN activates its PAN in an area of a channel slot that is not used by other coordinator(s). In other words, since each wireless network detects an unused channel slot in the network frame and uses the unused channel slot, the communications system association procedure involving activating a new network is greatly simplified.

According to a second aspect of the present invention, a communications control apparatus or method for operating a network by TDMA under a communications environment that allows coexistence of a plurality of networks in the same space is provided. Under the communications environment, a network frame including a plurality of channel slots is set. The communications control apparatus or method includes a network operating unit or step for operating its network using at least one channel slot.

The communications control apparatus or method according to the second aspect of the present invention may further include a network frame detecting unit or step for detecting whether or not a network frame is set in the same space. For example, the communications control apparatus operating the network broadcasts a beacon signal that describes the network topology state in synchronization with the network frame. Whether or not a network frame exists is determined by performing a receive operation for a period greater than or equal to the network frame period and determining whether or not a transmission signal is detected. Detection of a network frame refers to detection of a state in which communications is performed using a channel slot in the network frame period by at least one network in the same space.

In response to detection of no network frame, the network operating unit or step may actively set a network frame period including a plurality of channel slots, operate its network using at least one channel slot, and leave at least some of the channel slots unused.

In response to detection of an existing network frame, the network operating unit or step may detect an unused channel slot in the network frame by decoding a beacon signal from another station and operate its network using the unused channel slot.

The operating state of each channel slot in the network frame obtained by decoding the beacon signal from another station may be managed.

According to a third aspect of the present invention, a computer program written in a computer-readable format to perform on a computer system a process for operating a network by TDMA under a communications environment that allows coexistence of a plurality of networks in the same space is provided. The computer program includes a network frame detecting step of detecting whether or not a network frame is set in the same space; a network frame setting step of actively setting a network frame including a plurality of channel slots in response to detection of no network frame; a first operating slot setting step of operating its network using at least one channel slot while leaving at least some of the channel slots unused; and a second operating slot setting step of operating, in response to detection of an existing network frame, its network using an unused channel slot in the network frame.

The computer program according to the third aspect of the present invention defines a computer program written in a computer-readable format to realize a predetermined process on a computer system. In other words, installing the computer program according to the third aspect of the present invention into a computer system exhibits a cooperative operation on the computer system, thereby achieving advantages similar to those of the communications control apparatus or method according to the second aspect of the present invention.

According to the present invention, an excellent communications system, a communications apparatus and method, and a computer program therefor are provided that are capable of realizing coexistence of a plurality of wireless networks that are in contention with one another without performing a complicated procedure for associating one wireless network with another wireless network.

According to the present invention, a plurality of channel slots that can be repeatedly used is prepared in advance in a predetermined time period. When one of the channel slots is sequentially used by networks defined by the wireless communications system, the channel slot is multiplexed in the time domain, allowing a plurality of wireless networks to coexist with one another.

In other words, a case in which a communications control apparatus operates a wireless network is considered. When the communications control apparatus performs reception for a time period including all channel slots that are prepared in advance, if channel slots have already been set by another wireless network, the communications control apparatus uses an unused channel slot of the set channel slots to operate its wireless network. If no channel slot has been set by another wireless network, the communications control apparatus actively sets channel slots and configures a wireless network. Accordingly, a plurality of channels is prepared in UWB wireless communications that has difficulty in preparing a plurality of wireless channels in the frequency domain.

According to the present invention, a channel slot(s), the number of which corresponds to the necessary wireless transmission quantity, is allocated to each wireless network. Therefore, each wireless network can be operated in a suitable manner.

A wireless network that has prepared in advance a plurality of channel slots leaves at least some of the channel slots unused so that another wireless network can use the unused channel slot(s). Therefore, an environment that enables a plurality of wireless networks to coexist with one another in the same space can be configured.

According to the present invention, a wireless transmission link is used on a time-sharing multiplexing basis by a plurality of wireless networks. As in the known LAN system that prepares a plurality of frequency channels, this makes it possible for a plurality of wireless networks to coexist with one another in the same space.

According to the present invention, detection of a predetermined beacon signal at the beginning of each channel slot automatically initiates channel scanning of the other frequency channels. Searching for another wireless network is thus simplified.

According to the present invention, as in "Neighbor Piconet" to be standardized by IEEE 802.15.3, a new wireless network is allowed to obtain a channel slot. In other words, since a new wireless network need not undergo the association process to join a network serving as a parent, a plurality of networks can start to coexist with one another in a short period of time by a simple procedure.

According to the present invention, if no channel slot has been set by another wireless network, a wireless communications apparatus serving as a control station for a wireless network actively sets channel slots and configures a wireless network. Accordingly, the wireless network that is most suitable for a PAN is actively configured.

According to the present invention, a wireless communications apparatus serving as a control station for a wireless network has a function for actively setting channel slots. A control station for another wireless network residing in the same space subsequently uses an unused channel slot of the set channel slots to configure a wireless network. Accordingly, the wireless networks can coexist with each other.

According to the present invention, a wireless communications apparatus in a wireless network has a function for performing a receive operation across all channel slots in a network frame. The wireless communications apparatus can thus easily determine the presence of a surrounding wireless network.

Further objects, features, and advantages of the present invention will become apparent from the following description of the preferred embodiments with reference to the attached drawings.

BRIEF DESCRIPTION OF THE DRAWINGS

FIG. 7 is an illustration of an example of the structure of a beacon signal for use in the wireless communications system according to the embodiment of the present invention;

DESCRIPTION OF THE PREFERRED EMBODIMENTS

With reference to the drawings, embodiments of the present invention will be described in detail.

Figure 1:
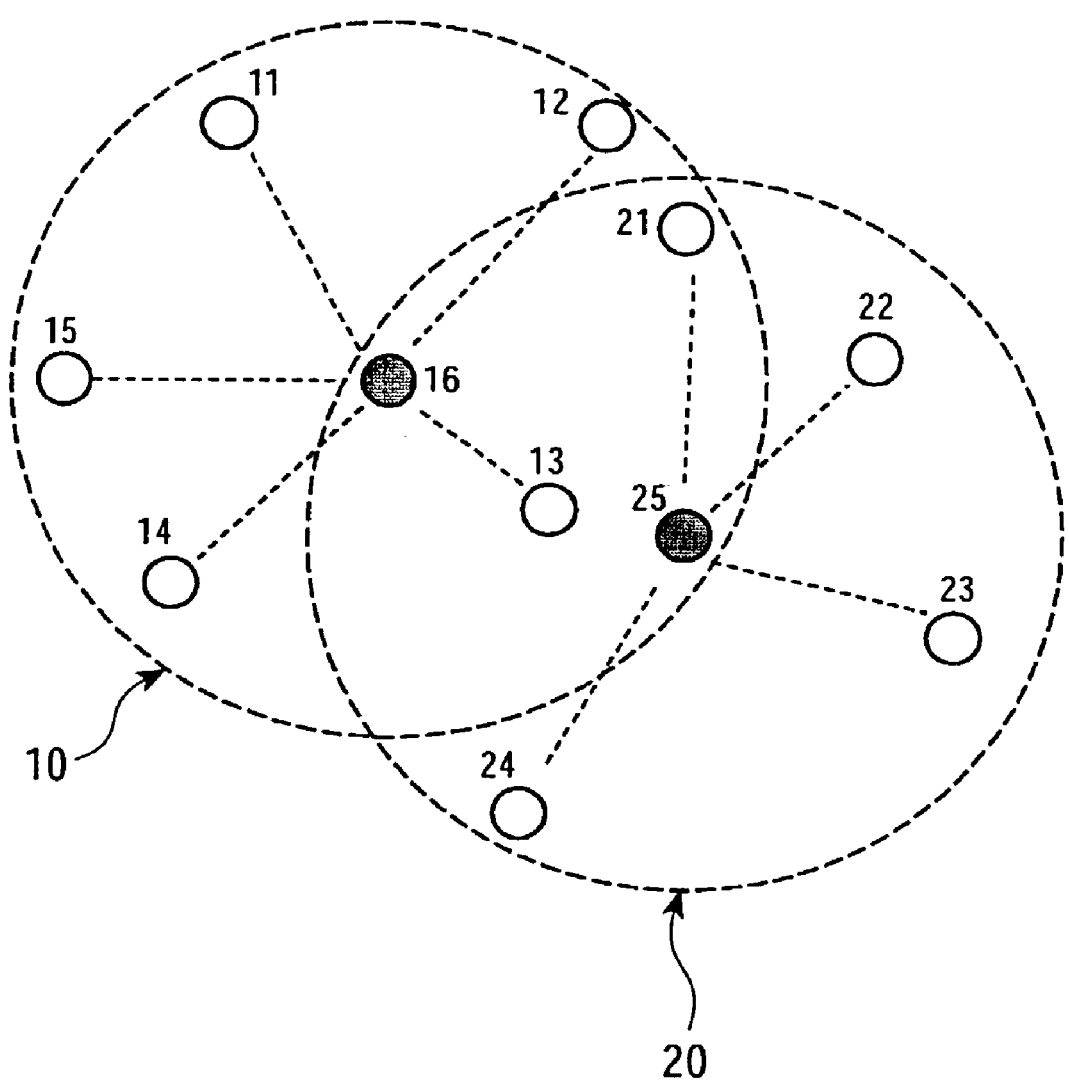
FIG. 1 is an illustration of a state in which a plurality of networks reside in the same space.

FIG. 1 shows a state in which a plurality of networks reside in the same space.

In the example shown in FIG. 1, a plurality of communications apparatuses 11, 12, 13, 14, and 15 configure a first UWB wireless network 10 having a communications apparatus 16 serving as a control station. At the same time, a plurality of communications apparatuses 21, 22, 23, and 24 configure a second UWB wireless network 20 having a communications apparatus 25 serving as a control station.

Referring to FIG. 1, each control station's radio-wave reachable range (corresponding to the broken-line circle) is assumed to be the range of the corresponding wireless network.

In this state, the communications apparatuses 13 and 21 residing in both networks can receive a plurality of beacon signals.

Also, the communications apparatuses 16 and 25, which serve as the control stations for the corresponding networks, can receive a beacon signal from the other network.

Figure 2:
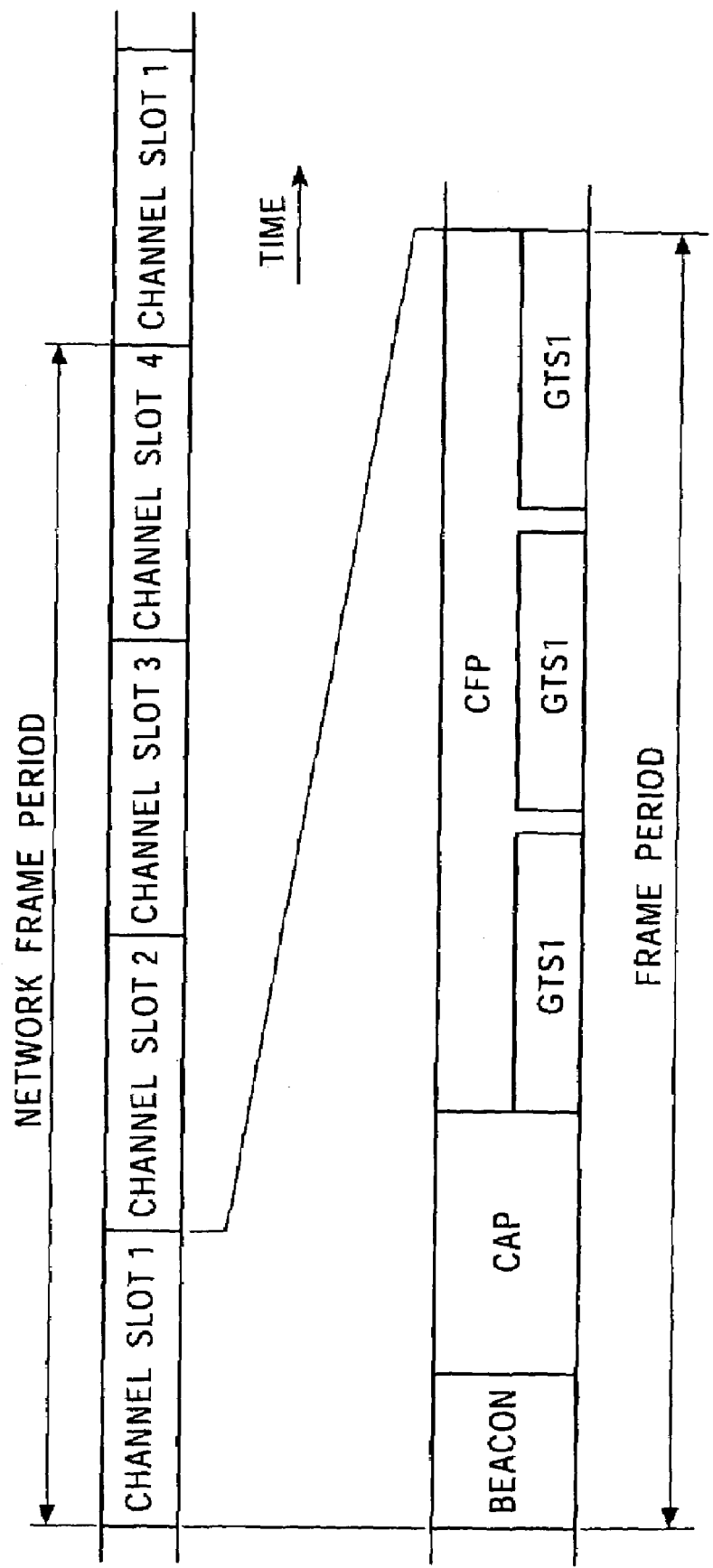
FIG. 2 is a diagram showing an example of the structure of a transmission frame period for use in a wireless communications system according to an embodiment of the present invention.

FIG. 2 illustrates an example of the structure of a transmission frame period for use in a wireless communications system according to an embodiment of the present invention.

In the example shown in FIG. 2, a predetermined time period is defined as a "network frame period".

The network frame shown in FIG. 2 consists of four channel slots, namely, a channel slot 1, a channel slot 2, a channel slot 3, and a channel slot 4. Subsequent to the channel slot 4, a channel slot 1 is again arranged. The channel slots are repeatedly set by a series of network frames that are continuous in the time domain.

In the example shown in FIG. 2, one network frame consists of four channel slots in order to simplify the description. Alternatively, one network frame may consist of any number of channel slots other than four.

Each of the channel slots is set as, as will be described later, a frame period for use by wireless networks coexisting in the same space. In other words, a beacon signal that is periodically transmitted from a communications apparatus serving as a control station for a wireless network determines the allocation of a frame period to be used by the wireless network. The wireless network is configured by incorporating wireless communications apparatuses that can communicate with the control station for the corresponding wireless network.

In the wireless network of this embodiment, each channel slot includes, subsequent to the beacon signal that defines the frame period, a contention access period (CAP) during which each communications apparatus performs asynchronous transmission using random access and a contention free period (CFP) that can only be used between specific wireless communications apparatuses.

In the CFP, a slot referred to as a guaranteed time slot (GTS) is appropriately allocated every time transmission is performed by an arbitrary communications apparatus, and wireless communications is performed. In the channel slot 1 shown in FIG. 2, three GTSs, namely, GTS-1, GTS-2, and GTS-3, are set to the CFP.

Figure 3:
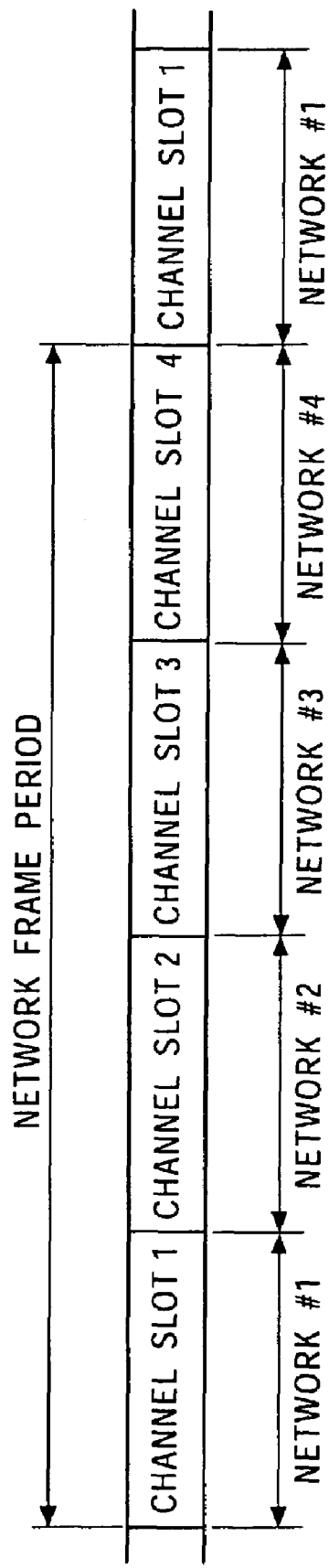
FIG. 3 is a diagram showing an example of a network frame including channel slots that are used by corresponding different wireless networks.

FIG. 3 illustrates an example of a network frame including channel slots that are used by corresponding different wireless networks.

In the example shown in FIG. 3, as in the example shown in FIG. 2, repetitive use of a wireless communications link in the time domain is made possible by four channel slots included in a network frame. Referring to FIG. 3, the channel slots are allocated to the corresponding wireless networks to enable a plurality of wireless networks to operate in a coexisting manner.

A first wireless network operates using the channel slot 1. A second wireless network operates using the channel slot 2. A third wireless network operates using the channel slot 3. A fourth wireless network operates using the channel slot 4.

The channel slot 1 again arrives, and the first wireless network starts operating. Such a structure is repeated.

Even if there are no second to fourth wireless networks, the first wireless network can operate using the channel slot 1.

Figure 4:
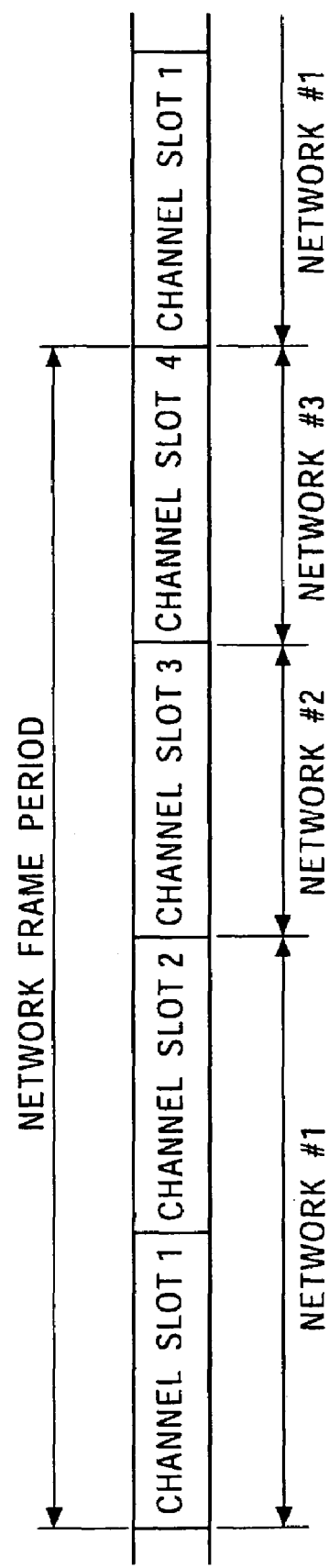
FIG. 4 is a diagram showing a modification of the network frame shown in FIG. 3.

FIG. 4 shows a modification of the network frame shown in FIG. 3. In the modification, a plurality of channel slots is used by one wireless network.

In the modification shown in FIG. 4, the first wireless network uses the channel slots 1 and 2. In such a case, the other wireless networks can operate using the channel slots 3 and 4. Specifically, the second wireless network and the third wireless network are configured. When the channel slot 1 again arrives, the first wireless network starts operating. Such a frame structure is repeated.

Figure 5:
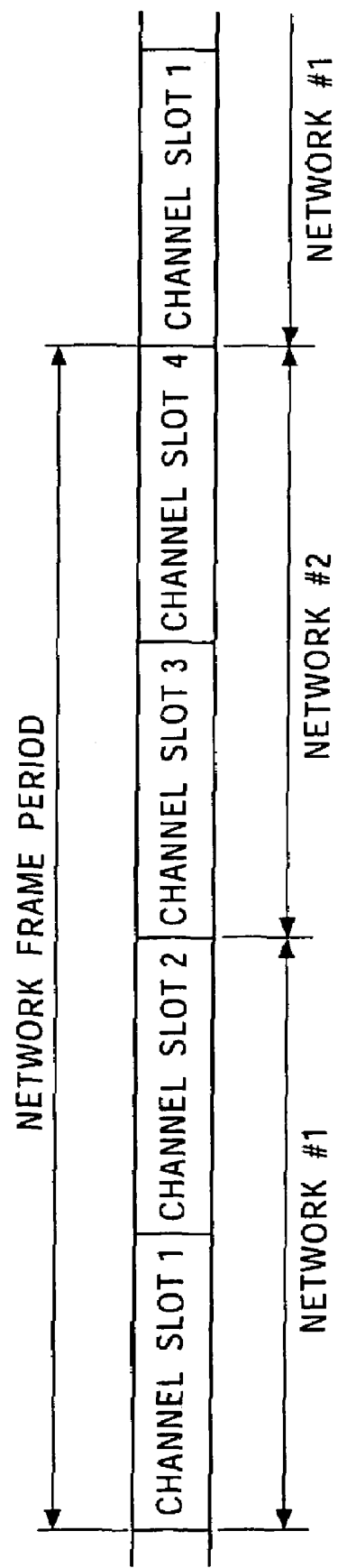
FIG. 5 is a diagram showing a modification of the network frame shown in FIG. 3.

FIG. 5 shows another modification of the network frame shown in FIG. 3. In this modification, a plurality of channel slots is used by one wireless network.

In this case, a plurality of channel slots is used by one wireless network. In the modification shown in FIG. 5, the channel slots 1 and 2 are used by the first wireless network. The remaining channel slots 3 and 4 are used by the second wireless network.

As discussed above, a subsequently-configured wireless network can operate using a plurality of channel slots.

Figure 6:
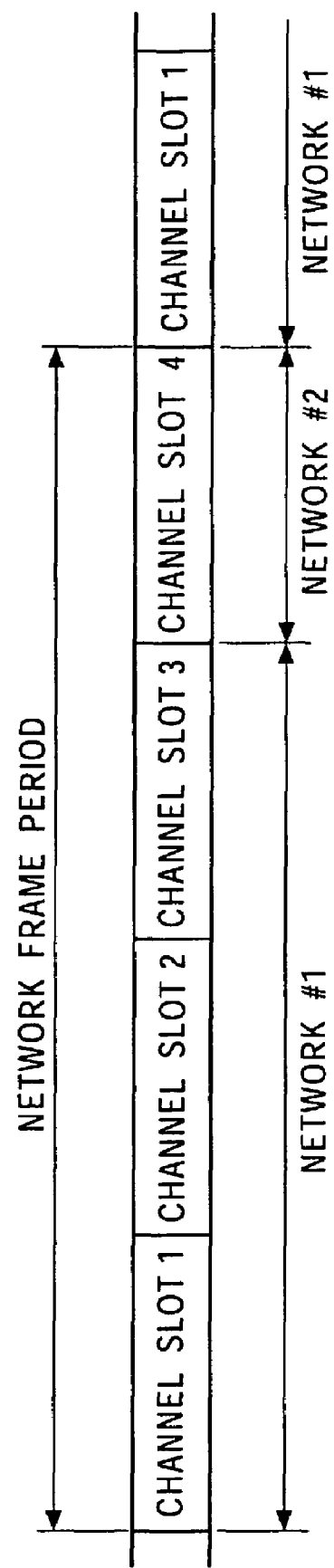
FIG. 6 is a diagram showing a modification of the network frame shown in FIG. 3.

FIG. 6 is another modification of the network frame shown in FIG. 3. In this modification, a plurality of channel slots is used by one wireless network.

In this case, a plurality of channel slots is used by one wireless network. In the modification shown in FIG. 6, the channel slots 1, 2, and 3 are used by the first wireless network. The remaining channel slot 4 is used by the second wireless network.

As discussed above, the first wireless network operates while leaving at least one channel slot of the network frame unused. This leaves place for a wireless network to be configured subsequently in the same space.

FIG. 7 shows an example of the structure of a beacon signal for use in the wireless communications system of this embodiment. The beacon signal is to be transmitted using the same signaling system to different wireless networks residing in the same wireless communications system.

As shown in FIG. 7, the beacon signal includes a beacon identifier for identifying that the signal is a beacon, an apparatus identifier for identifying the apparatus serving as the control station, a network synchronization parameter describing a parameter for synchronizing with the network, GTS allocation information describing the GTS allocation state, operating channel slot information describing information on a channel slot used by the wireless network, and other slot information indicating that another channel slot is used by a different wireless network.

If necessary, the parameters illustrated in FIG. 7 may be eliminated from the beacon signal, or additional parameters may be included in the beacon signal.

Figure 8:
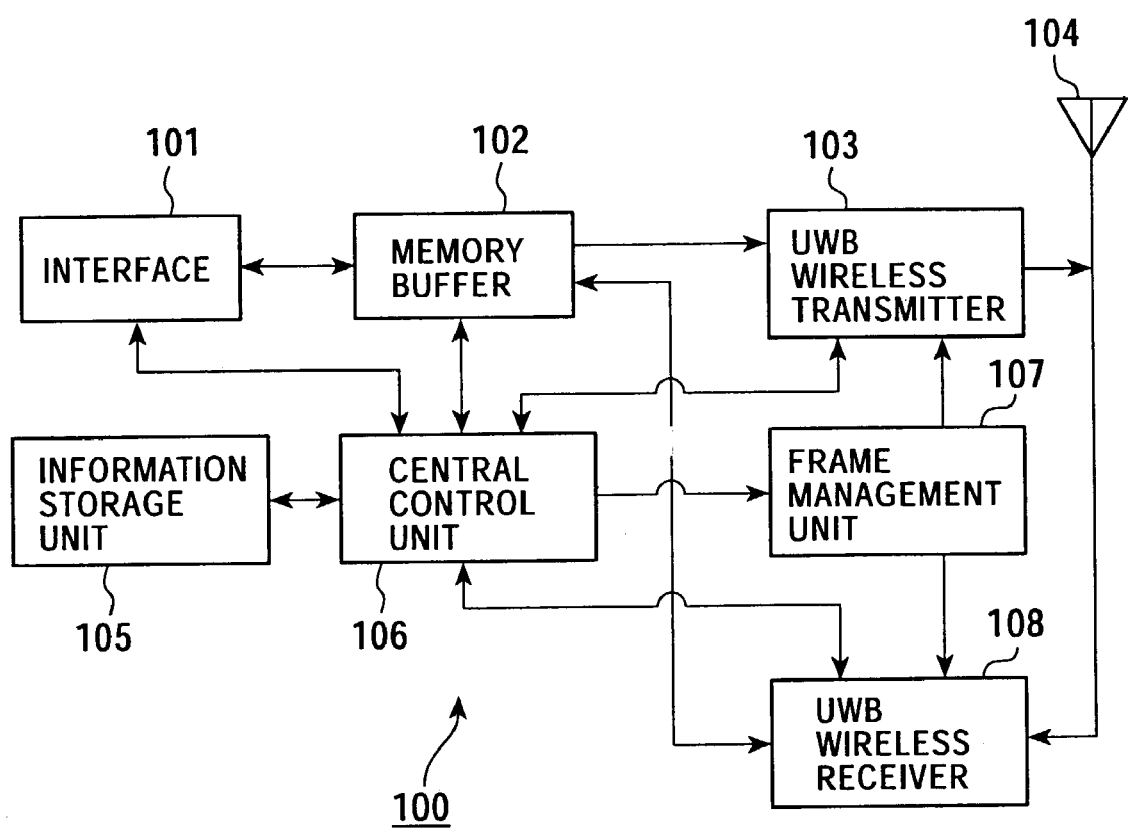
FIG. 8 is a functional block diagram schematically showing a wireless communications apparatus according to the embodiment of the present invention.

FIG. 8 schematically shows the functional configuration of a wireless communications apparatus 100 of this embodiment. The wireless communications apparatus 100 operates as a control station or a terminal operating under the control of a control station under a wireless communications environment in which a plurality of wireless networks coexist with one another in the same space.

As shown in FIG. 8, the wireless communications apparatus 100 includes an interface 101, a memory buffer 102, a UWB wireless transmitter 103, an antenna 104, an information storage unit 105, a central control unit 106, a frame management unit 107, and a UWB wireless receiver 108.

A series of operations performed in the wireless communications apparatus 100 is activated on the basis of an instruction from the central control unit 106. The central control unit 106 operates in accordance with the timing of a transmission frame period. The central control unit 106 operates in accordance with operation procedure commands (program) stored in the information storage unit 105.

A personal computer, a personal digital assistant (PDA), or another type of information apparatus (not shown) is connected to the interface 101. If information is supplied from the connected apparatus via the interface 101, the central control unit 106 temporarily stores the information in the memory buffer 102 and instructs the UWB wireless transmitter 103 to perform wireless transmission. The UWB wireless transmitter 103 performs D/A conversion and up-conversion of the transmission data in the memory buffer 102 and, when predetermined transmission time arrives, transmits the converted data as a UWB wireless transmission signal from the antenna 104.

In order that the wireless communications apparatus 100 performs information reception, in response to the arrival of predetermined reception time, the UWB wireless receiver 108 is activated to perform down-conversion and A/D conversion of the signal from the antenna 104, and the signal is received. The obtained information is written into the memory buffer 102. The central control unit 106 reconstructs the received information in the memory buffer 102 and transfers the information to the connected apparatus via the interface 101.

In order that the wireless communications apparatus 100 operates as a control station for a network, if a wireless network need be configured, it is determined whether or not another wireless network already resides in the same space. In this case, the UWB wireless receiver 108 tries in advance to receive a beacon signal from another wireless network for a period greater than or equal to the network frame period by decoding signals received via the antenna 104.

When it is determined that there is no beacon signal, the central control unit 106 actively sets channel slots (see FIG. 3) and stores the settings in the frame management unit 107. The central control unit 106 generates a beacon signal (see FIG. 7) on the basis of the channel slots that have been actively set by the central control unit 106 and stores the beacon signal in the memory buffer 102. The UWB wireless transmitter 103 transmits the beacon signal from the antenna 104 in a predetermined network frame period. The network frame period consists of a plurality of channel slots. A subsequently-configured wireless network in the same space is permitted to use some of the channel slots.

In contrast, when it is determined by the central control unit 106 that there is a beacon signal, the central control unit 106 sets existing channel slots on the basis of the beacon signal and stores the settings in the frame management unit 107. The central control unit 106 generates a beacon signal for controlling its network and temporarily stores the beacon signal in the memory buffer 102. Using an unused channel slot in the network frame period, the beacon signal is transmitted from the antenna 104.

When the wireless communications apparatus 100 operates not as a control station but as a general communications terminal, signals received by the UWB wireless receiver 108 via the antenna 104 for a period greater than or equal to the network frame period are decoded to perform a receive operation of a beacon signal transmitted from a communications apparatus serving as the control station. The received beacon signal information is supplied to the central control unit 106 to determine the type of wireless network.

The configuration of the wireless communications apparatus 100 is not limited to that shown in FIG. 8. Some or all of the functional modules shown in FIG. 8 may be replaced by other components if the same functions or operation characteristics can be realized.

Figure 9:
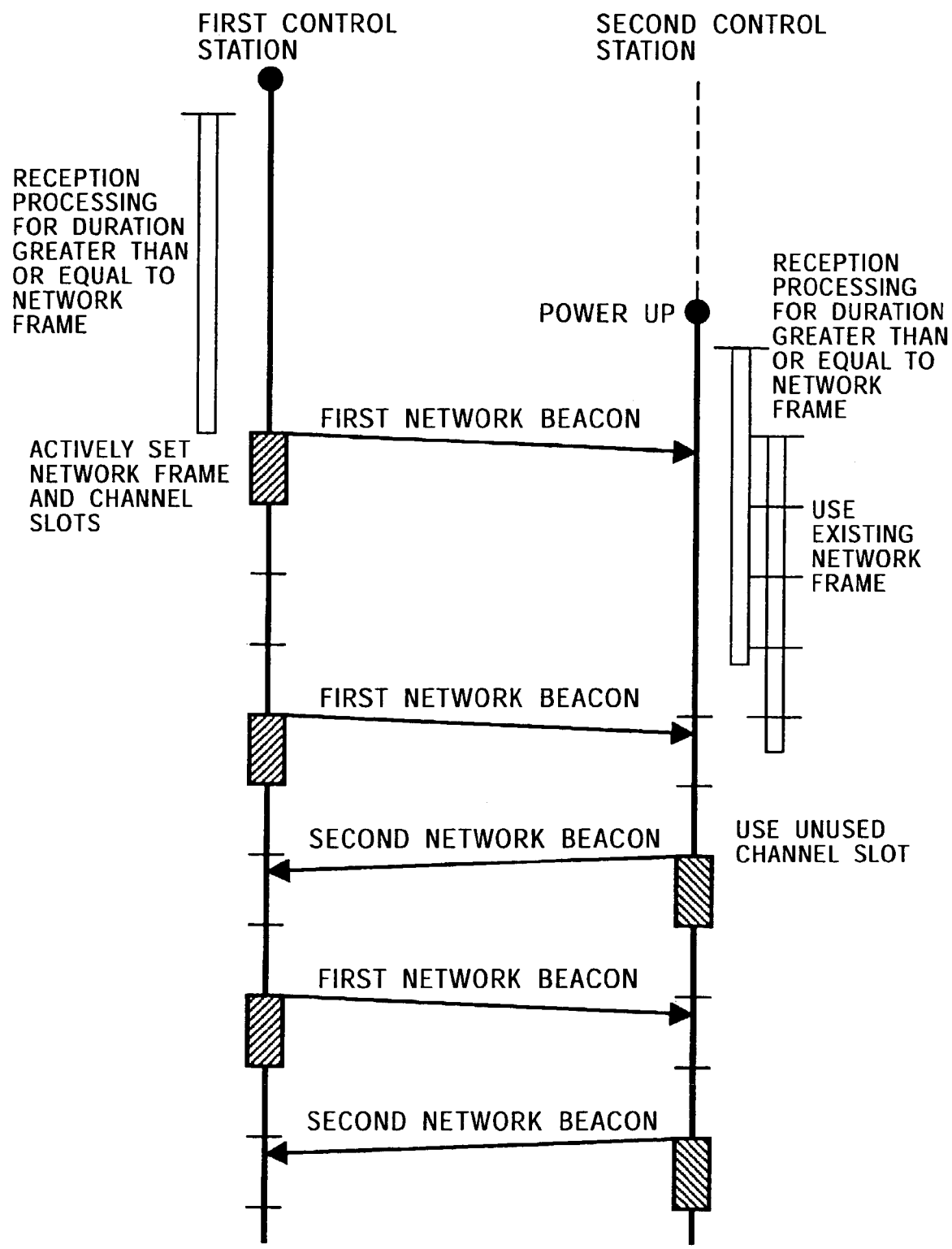
FIG. 9 is a diagram showing an operation sequence performed between control stations under a wireless communications environment in which a plurality of wireless networks coexist with one another in the same space.

FIG. 9 shows an operation sequence performed between control stations under a wireless communications environment in which a plurality of wireless networks coexist with one another in the same space. In the example shown in FIG. 9, a first control station actively sets a network frame under the circumstances in which no network frame has been set. A second control station operates its network using an unused channel slot of an existing network frame that has already been set.

After being turned on, the first control station performs a receive operation for a time period greater than or equal to the network frame. When no signal is received during the time period, the first control station sets a network frame and its channel slots and transmits (broadcasts) a beacon signal from a first network, which describes the settings of the network frame and channel slots. As a result, the first control station starts operating its network (first network).

In this example, one network frame consists of four channel slots. Referring to FIG. 9, the shaded square represents a channel slot used by the first network.

After being turned on, the second control station performs a receive operation for a time period greater than or equal to the network frame. During this time period, the second control station receives the beacon signal from the first network to detect that the network frame has already been set. Detection of the network frame refers to detection of a state in which communications is performed using a channel slot in the network frame period by at least one network in the same space.

In such a case, the second control station transmits a beacon signal from a second network using an unused channel slot in the existing network frame, thus starting operating its network (second network). Referring to FIG. 9, the shaded square represents a channel slot used by the second network.

When third and fourth control stations reside in the same space, the operation similar to that of the second control station is performed.

Figure 10:
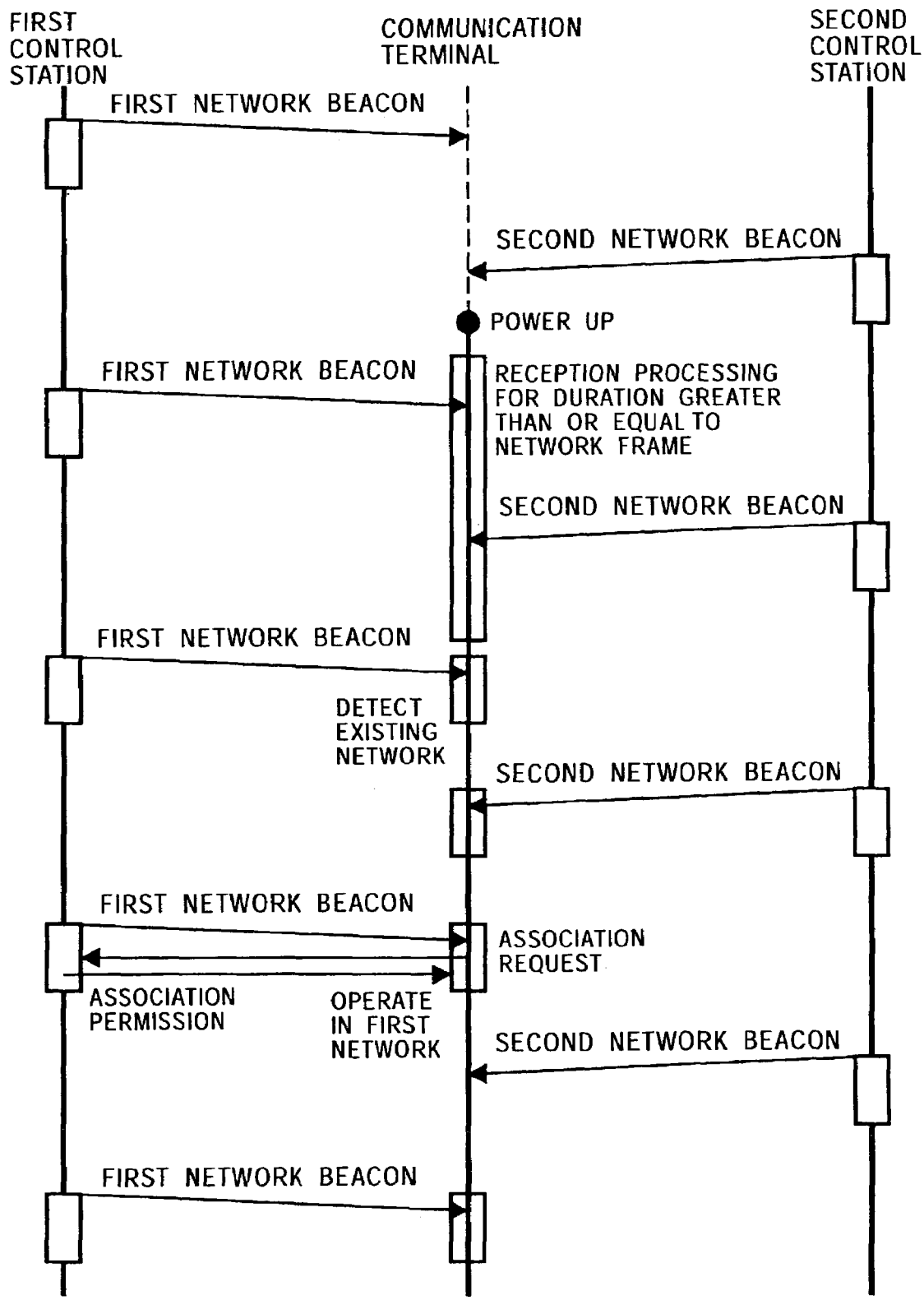
FIG. 10 is a diagram showing an operation sequence performed by a general communications terminal under the wireless communications environment in which the plurality of wireless networks coexist with one another in the same space.

FIG. 10 shows an operation sequence performed by a general communications terminal under the wireless communications environment in which the plurality of wireless networks coexist with one another in the same space. This corresponds to an operation sequence of a communications apparatus that has no function for operating as a control station.

In the example shown in FIG. 10, a communications terminal resides at a place where the communications terminal can receive beacon signals from both the first and second control stations. Referring to FIG. 10, the square represents a channel slot used by a network.

After being turned on, the communications terminal performs a receive operation for a time period greater than or equal to the network frame. During the time period, the communications terminal tries to receive a beacon signal from a control station for an arbitrary network.

On the basis of information described in the received beacon signal, the communications terminal determines which network to join and, using a channel slot that is used by the desired network, transmits an association request to a control station for the desired network.

In the operation sequence shown in FIG. 10, the communications terminal transmits an association request and receives an association permission response in the channel slot used by the first network in order to join the first network.

Subsequent to reception of the association permission response from the control station for the first network, the communications terminal enters a state in which the communications terminal can operate in the first network.

Figure 11:
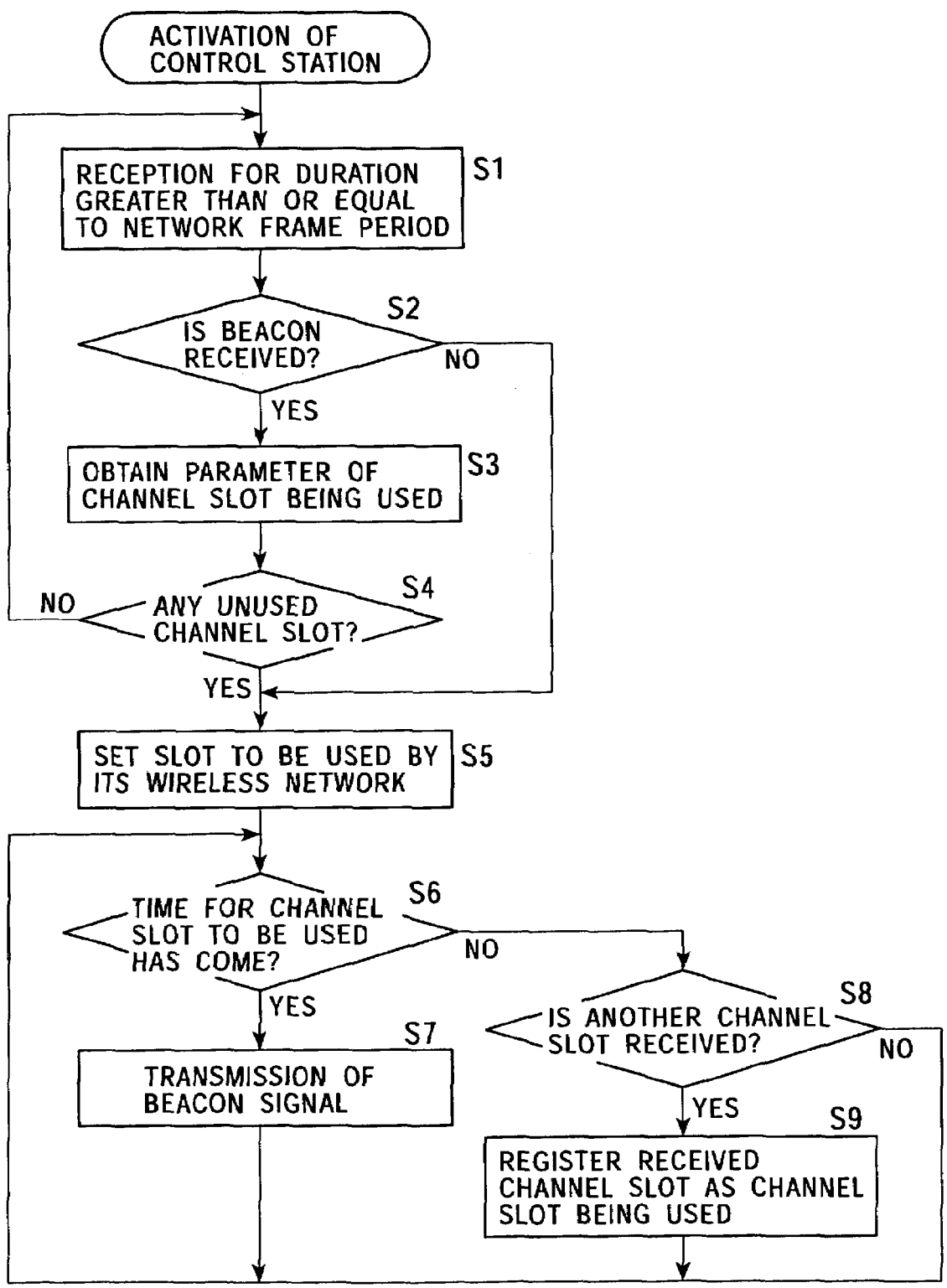
FIG. 11 is a flowchart showing a process of enabling the wireless communications apparatus of this embodiment to operate as a control station under the wireless communications environment in which the plurality of wireless networks coexist with one another in the same space.

FIG. 11 is a flowchart showing a process of enabling the wireless communications apparatus 100 of this embodiment to operate as a control station under the wireless communications environment in which the plurality of wireless networks coexist with one another in the same space. The process is realized by executing, by the central control unit 106, the program stored in the information storage unit 105. Hereinafter with reference to the flowchart shown in FIG. 11, the operation of the wireless communications apparatus 100 serving as the control station will now be described in detail.

After being turned on, the wireless communications apparatus 100 that has been set to operate as the control station for the network consecutively performs receive operations for a time period greater than or equal to the network frame period (step S1). The wireless communications apparatus 100 determines whether or not a beacon signal is received (step S2).

If a beacon signal is received, another wireless network resides at the place. The wireless communications apparatus 100 obtains a parameter of the channel slot being used. At this time, the network frame is set according to the existing wireless network.

It is determined whether or not there is any unused channel slot in the network frame (step S4). If there is/are an unused channel slot(s), the wireless communications apparatus 100 sets a channel slot to be used by its wireless network (step S5).

In contrast, if it is determined in step S4 that there is no unused channel slot, the process returns to step S1, and activation is consecutively performed.

If no beacon is received in step S2, the process skips to step S5, and the channel slot to be used by its wireless network is set.

The wireless communications apparatus 100 waits for the arrival of the channel slot to be used by its network (step S6). Every time the corresponding channel slot arrives, a beacon signal is repeatedly transmitted (step S7), and the wireless network is thus operated.

Other than a time at which a beacon signal is transmitted, the wireless communications apparatus 100 tries to receive a beacon signal from another wireless network using a channel slot other than that used by its network (step S8). If a beacon signal from another wireless network is received, the fact that the channel slot specified by the received beacon signal is busy may be registered in an internal memory (step S9).

Figure 12:
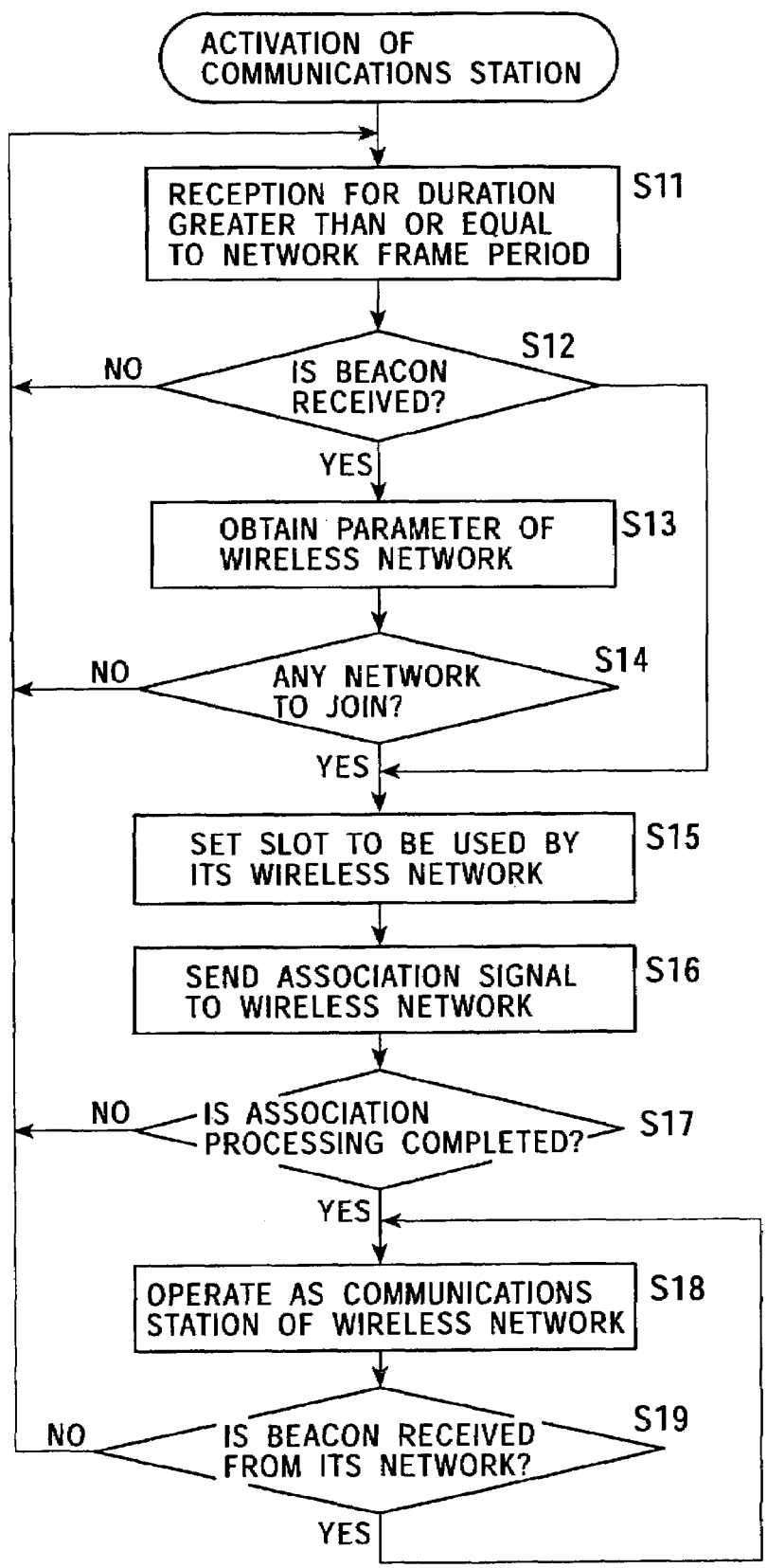
FIG. 12 is a flowchart showing a process of enabling the wireless communications apparatus of this embodiment to operate as a general communications station under the wireless communications environment in which the plurality of wireless networks coexist with one another in the same space.
Figure 13:
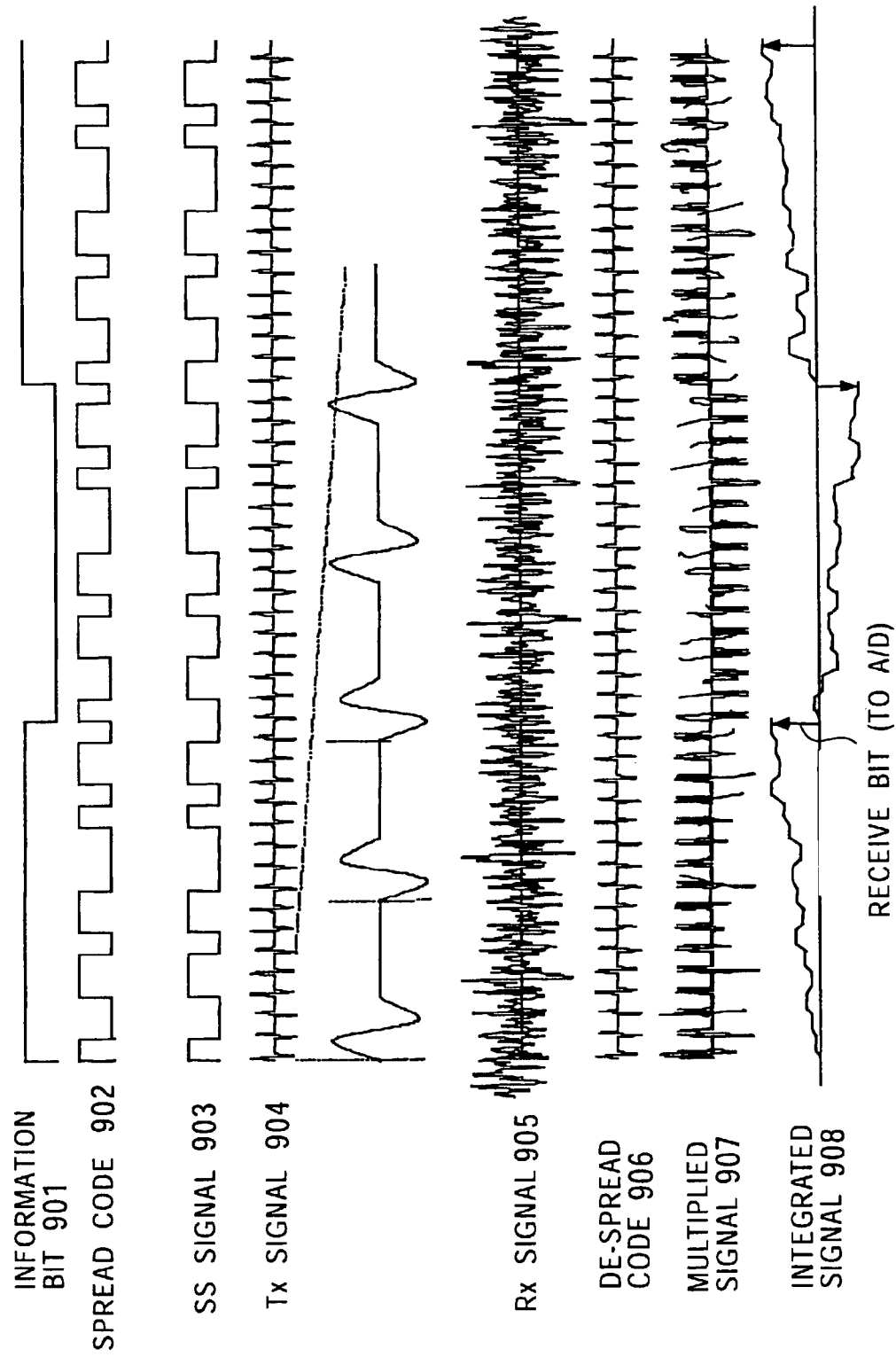
FIG. 13 is a chart showing an example of data transmission using UWB.

FIG. 12 is a flowchart showing a process of enabling the wireless communications apparatus 100 of this embodiment to operate as a general communications station under the environment in which the plurality of wireless networks coexist with one another in the same space. The process is actually realized by executing, by the central control unit 106, the program stored in the information storage unit 105. With reference to the flowchart shown in FIG. 12, the operation of the wireless communications apparatus 100 serving as the communications station will now be described in detail.

After being turned on, the wireless communications apparatus 100 that has been set not to operate as a control station for a network performs consecutive receive operations for a time period greater than or equal to the network frame period (step S11). The wireless communications apparatus 100 determines whether or not a beacon is received from a control station for a network (step S12).

When a beacon signal is received from the control station, it is determined that a wireless network resides at this place, and a parameter for a channel slot used by the wireless network and the network identifier information are obtained (step S13). If there is a plurality of wireless networks residing at this place, parameters for the corresponding wireless networks are retained.

The wireless communications apparatus 100 determines whether or not there is a wireless network for its wireless communications apparatus to join (step S14). If there is a wireless network to join, a channel slot to be used by its wireless network is set (step S15), and a predetermined association signal is transmitted to a control station for the wireless network (step S16).

The wireless communications apparatus 100 waits for a response from the control station (step S17). In response to reception of a response from the control station, the wireless communications apparatus 100 starts operating as a communications terminal in the wireless network under the control of the control station (step S18).

It is determined whether or not a beacon signal corresponding to a wireless network can be-received. The wireless communications apparatus 100 repeats a receive operation of the beacon signal (step S19). Every time the beacon signal is received, the process returns to step S18, and the wireless communications apparatus 100 continues operating as a communications apparatus for the wireless network.

In contrast, when no beacon signal is received, the process returns to step S11, and channel scanning for searching for a wireless network is again started.

If the association with a wireless network in step S17 is not completed, if it is determined in step S14 that there is no wireless network to join, or if no beacon signal is received in step S12, the process returns to step S1, and channel scanning to search for a wireless network is again started.

While the present invention has been described in detail with reference to what are presently considered to be the preferred embodiments, it is to be understood to those skilled in the art that various modifications and substitutions can be made without departing from the spirit and scope of the present invention. In other words, the present invention has been described using the embodiments only for illustration purposes and should not be interpreted in a limited manner. The scope of the present invention is to be determined solely by the appended claims.

What is claimed is:

1. A communications control apparatus for operating a network by TDMA under a communications environment that allows coexistence of a plurality of networks in the same space, wherein, under the communications environment, a network frame including a plurality of channel slots is set, the communications control apparatus comprising:
   network operating means for operating its network using at least one channel slot; and
   network frame detecting means for detecting whether a network frame is set in the same space,
   wherein, in response to detection of no network frame, the network operating means actively sets a network frame including a plurality of channel slots, operates its network using at least one channel slot, and leaves at least some of the channel slots unused.

2. A communications control apparatus according to claim 1, wherein, in response to detection of an existing network frame, the network operating means operates its network using an unused channel slot in the network frame.

3. A communications control apparatus according to claim 1, wherein the network frame detecting means performs a receive operation for a period greater than or equal to a predetermined network frame period and detects the presence of a network frame in accordance with detection of a transmission signal.

4. A communications control apparatus according to claim 1, further comprising frame managing means for managing the operating state of each channel slot in the network frame.

5. A communications control method for operating a network by TDMA under a communications environment that allows coexistence of a plurality of networks in the same space, wherein, under the communications environment, a network frame including a plurality of channel slots is set, the communications control method comprising:
   a network operating step of operating its network using at least one channel slot, and
   a network frame detecting step of detecting whether a network frame is set in the same space,
   wherein, in the network operating step, in response to detection of no network frame, a network frame including a plurality of channel slots is actively set, its network is operated using at least one channel slot, and at least some of the channel slots are left unused.

6. A communications control method according to claim 5, wherein, in the network operating step, in response to detection of an existing network frame, its network is operated using an unused channel slot in the network frame.

7. A communications control method according to claim 5, wherein, in the network frame detecting step, a reception operation is performed for a period greater than or equal to a predetermined network frame period to detect the presence of a network frame in accordance with detection of a transmission signal.

8. A communications control method according to claim 5, further comprising a frame managing step of managing the operating state of each channel slot in the network frame.

9. A computer program written in a computer-readable format to perform on a computer system a process for operating a network by TDMA under a communications environment that allows coexistence of a plurality of networks in the same space, the computer program comprising:

a network operating step of operating a network using at least one channel slot; and a network frame detecting step of detecting whether a network frame is set in the same space, wherein, in the network operating step, in response to detection of no network frame, a network frame including a plurality of channel slots is actively set, the network is operated using at least one channel slot, and at least some of the channel slots are left unused.

* * * * *

UNITED STATES PATENT AND TRADEMARK OFFICE
CERTIFICATE OF CORRECTION

PATENT NO.         : 7,277,412 B2
APPLICATION NO. : 10/406383
DATED                  : October 2, 2007
INVENTOR(S)       : Shigeru Sugaya et al.

It is certified that error appears in the above-identified patent and that said Letters Patent is hereby corrected as shown below:

Column 13, line 60, change "S1" to -- S11 --.

Signed and Sealed this

Seventeenth Day of June, 2008

JON W. DUDAS
*Director of the United States Patent and Trademark Office*